(12) United States Patent
Selvaganapathy et al.

(10) Patent No.: US 11,991,637 B2
(45) Date of Patent: *May 21, 2024

(54) PAGING INDICATION CHANNEL FOR EC-GSM-IoT

(71) Applicant: Nokia Technologies Oy, Espoo (FI)

(72) Inventors: Srinivasan Selvaganapathy, Bangalore (IN); Jürgen Hofmann, Marching (DE); Hartmut Wilhelm, Ulm (DE); Muneender Chiranji, Hyderabad (IN); Kari Juhani Niemelä, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,962

(22) Filed: Sep. 30, 2021

(65) Prior Publication Data

US 2022/0046544 A1 Feb. 10, 2022

Related U.S. Application Data (62) Division of application No. 16/765,931, filed as application No. PCT/EP2018/080623 on Nov. 8, 2018, now Pat. No. 11,166,237.

(30) Foreign Application Priority Data

Nov. 24, 2017 (IN) .............................. 201741042232

(51) Int. Cl.
*H04W 52/02* (2009.01)
*H04W 68/00* (2009.01)

(52) U.S. Cl.
CPC ... *H04W 52/0235* (2013.01); *H04W 52/0229* (2013.01); *H04W 52/0274* (2013.01); *H04W 68/005* (2013.01)

(58) Field of Classification Search
CPC ......... H04W 52/0235; H04W 52/0229; H04W 52/0274; H04W 68/005; Y02D 30/70
See application file for complete search history.

(56) References Cited

U.S. PATENT DOCUMENTS

| 11,553,423 B2 * | 1/2023 | Sui ................... H04W 52/0229 |
| 2014/0119343 A1 * | 5/2014 | Chin ................... H04W 68/12 370/335 |

(Continued)

FOREIGN PATENT DOCUMENTS

| CN | 104427591 A | 3/2015 |
| CN | 107079250 A | 8/2017 |

(Continued)

OTHER PUBLICATIONS

"Signalling for efficient decoding of physical channels", Nokia, Nokia Shanghai Bell, 3GPP TSG RAN WG1 Meeting #90, R1-1713789, Aug. 2017, 10 pages.

(Continued)

*Primary Examiner* — Robert C Scheibel
(74) *Attorney, Agent, or Firm* — Harrington & Smith (57) ABSTRACT

In accordance with the example embodiments of the invention there is at least a method an apparatus to perform determining signaling comprising at least one wake-up signal to indicate an occurrence or a non-occurrence of a paging request associated with a next paging occasion of a network device; and sending the signaling comprising the at least one wake-up signal toward a network device in a communication network, wherein the at least one wake-up signal is to cause the network device to determine whether to leave at the next paging occasion an energy saving sleep mode to receive the paging request. Further, there is performing receiving by a network device in a communication network at least one wake-up signal to indicate an occurrence or a non-occurrence of a paging request, wherein the (Continued)

at least one wake-up signal is for use by the network device to determine whether to leave at its next paging occasion an energy saving sleep mode to receive the paging request.

12 Claims, 5 Drawing Sheets

(56) References Cited

U.S. PATENT DOCUMENTS

| | | | | |
|---|---|---|---|---|
| 2015/0249945 | A1* | 9/2015 | Katamreddy | H04W 36/14 |
| | | | | 455/436 |
| 2016/0345380 | A1* | 11/2016 | Diachina | H04W 4/70 |
| 2018/0263011 | A1 | 9/2018 | Wang | |
| 2018/0302190 | A1 | 10/2018 | Hofstrom | |
| 2020/0077338 | A1 | 3/2020 | Sui | |
| 2021/0045060 | A1* | 2/2021 | Sui | H04W 52/0219 |
| 2021/0153120 | A1* | 5/2021 | Atungsiri | H04L 27/2636 |

FOREIGN PATENT DOCUMENTS

| | | |
|---|---|---|
| GB | 2562111 A | 11/2018 |
| WO | WO-2017/081362 A1 | 5/2017 |
| WO | WO-2017/196611 A1 | 11/2017 |

OTHER PUBLICATIONS

"Wake-up signal configurations and procedures", Nokia, Nokia Shanghai Bell, 3GPP TSG RAN WG1 Meeting #91, R1-1720133, Dec. 2017, 5 pages.
3GPP TSG-RAN WG2 #100, Reno, NV, USA, Nov. 27-Dec. 1, 2017, R2-1713033, "Wake-up signal for NB-IoT & eMTC", Ericsson, 10 pgs.
Azizi, Shahrnaz, et al., "Preamble Options", Jul. 10, 2017, Intel Corporation, 10 pgs.
3GPP TS 27.010 V14.0.0 (Mar. 2017), "3rd Generation Partnership Project; Technical Specification Group Core Network and Terminals; Terminal Equipment to User Equipment (TE-UE) multiplexer protocol (Release 14)", Section 5.1.5.1., 2 pgs.
3GPP TSG RAN Meeting #75, Dubrovnik, Croatia, Mar. 6-9, 2017, RP-170429, "On further evolution of eMTC and NB-IoT in ReI-15 LTE", RP-170429, Intel Corporation, 14 pgs.
"R1-1709161, Discussion on wake-up signal for power consumption reduction for feNB-IoT", Sequans Communications, 3GPP TSG-RAN WG1 #89, May 2017, 4 pages.
"R1-1720128, Wake-up signal for efeMTC", Nokia, Nokia Shanghai Bell, 3GPP TSG RAN WG1 Meeting #91, Dec. 2017, 8 pages.
"R1-1714178, Discussion on wake-up signal for power consumption reduction for feNB-IoT", Sequans Communications, 3GPP TSG RAN WG1 Meeting #90, Aug. 2017, 4 pages.

* cited by examiner

DETERMINING SIGNALING COMPRISING AT LEAST ONE WAKE-UP SIGNAL TO INDICATE AN OCCURRENCE OR A NON-OCCURRENCE OF A PAGING REQUEST ASSOCIATED WITH A NEXT PAGING OCCASION OF A NETWORK DEVICE; AND

720

SENDING THE SIGNALING COMPRISING THE AT LEAST ONE WAKE-UP SIGNAL TOWARD A NETWORK DEVICE IN A COMMUNICATION NETWORK, WHEREIN THE AT LEAST ONE WAKE-UP SIGNAL IS TO CAUSE THE NETWORK DEVICE TO DETERMINE WHETHER TO LEAVE AT THE NEXT PAGING OCCASION AN ENERGY SAVING SLEEP MODE TO RECEIVE THE PAGING REQUEST

RECEIVING BY A NETWORK DEVICE IN A COMMUNICATION NETWORK AT LEAST ONE WAKE-UP SIGNAL TO INDICATE AN OCCURRENCE OR A NON-OCCURRENCE OF A PAGING REQUEST, WHEREIN THE AT LEAST ONE WAKE-UP SIGNAL IS FOR USE BY THE NETWORK DEVICE TO DETERMINE WHETHER TO LEAVE AT ITS NEXT PAGING OCCASION AN ENERGY SAVING SLEEP MODE TO RECEIVE THE PAGING REQUEST

FIG.7B

PAGING INDICATION CHANNEL FOR EC-GSM-IoT

CROSS REFERENCE TO RELATED APPLICATIONS

This is a divisional patent application of application Ser. No. 16/765,931 filed May 21, 2020, now U.S. Pat. No. 11,166,237, which is a national stage application of International Patent Application Number PCT/EP2018/080623 filed Nov. 8, 2018, which is hereby incorporated by reference in its entirety, and claims priority to IN 201741042232 filed Nov. 24, 2017.

TECHNICAL FIELD

The teachings in accordance with the exemplary embodiments of this invention relate generally to a communication burst design which can convey the wakeup/sleep with few bursts but with high reliability for the detection even at extended coverage condition and, more specifically, relate to a new sequence design to indicate the presence of the paging request in upcoming paging channel blocks which can fit within few bursts but also provides reliable detection performance at extended coverage condition.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AGCH Access Grant Channel
BSC Base Station Controller
BTS Base Transceiver Station
CCCH Common Control Channel
CC1 to CC4 EC-GSM-IoT coverage classes
CIoT Cellular IoT (internet of things)
EC Extended Coverage
EDGE Enhanced Data rates for GSM Evolution
eDRX extended Discontinuous Reception
FN Frame Number
GSM Global System for Mobile communications
MF Multi-Frame
MS Mobile Station
PCH Paging Channel
PEO Power Efficient Operation
PSM Power Save Mode
RRH Remote Radio Head
TN Timeslot Number
TSC Training Sequence Code
UE User Equipment (synonym to MS)
WUS Wake-Up Signal (for extended coverage sometimes also referred to as EC-WUS)

EC-GSM-IoT (CIoT) is building on GPRS/EGPRS cellular technologies for machine-type communications (MTC). New CIoT systems deployments requirements continue to be identified.

For new CIoT use cases, which require lower latency for network commands in the range of few minutes, it requires the CIoT device to be configured with lower eDRX cycles with a length in the order of few minutes. With lower eDRX cycle the power consumption increases due to frequent wake up of UE for listening to paging channels. This requirement is applicable for use cases such as smart bike rental/bi-cycles where the lock at the bike needs to be opened based on network command when the user scans the bi-cycle code along with the payment. Here the activation is expected to happen within 1-2 minutes. This requires the CIoT device to be configured with an eDRX cycle in the range of few minutes. With lowering of the eDRX cycle for the above use cases, the energy consumption for page reception becomes the most important factor for the overall battery life time of the device. This requires further power saving for paging reception.

To improve this power saving for paging reception the example embodiments of the invention provide a signaling design to convey the wakeup/sleep with only one or a few bursts and with high detection reliability.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine signaling comprising at least one wake-up signal to indicate an occurrence or a non-occurrence of a paging request associated with a next paging occasion of a network device; and send the signaling comprising the at least one wake-up signal toward a network device in a communication network, wherein the at least one wake-up signal is to cause the network device to determine whether to leave at the next paging occasion an energy saving sleep mode to receive the paging request.

In another example aspect of the invention, there is a method comprising: determining signaling comprising at least one wake-up signal to indicate an occurrence or a non-occurrence of a paging request associated with a next paging occasion of a network device; and sending the signaling comprising the at least one wake-up signal toward a network device in a communication network, wherein the at least one wake-up signal is to cause the network device to determine whether to leave at the next paging occasion an energy saving sleep mode to receive the paging request.

A further example embodiment is a method comprising the method of the previous paragraph, wherein the at least one wake-up signal comprises a burst transmission that is sent in a multi-frame control channel, wherein the multi-frame control channel is for extended coverage and wherein the at least one wake-up signal is mapped to at least one coverage class, wherein the multi-frame control channel comprises at least one of a paging block and an access grant block, wherein the multi-frame control channel comprises 51 data burst locations, wherein the at least one coverage class comprises EC-GSM-IoT coverage classes CC1, CC2, CC3, and CC4, wherein a number of the at least one wake-up signal burst is signaled in predefined frames, in particular predefined combinations of consecutive frames, mapped to different ones or combinations of the coverage classes, wherein the determining of the occurrence or non-occurrence of the paging request is based on paging requests for a paging group in the multi-frame control channel, wherein the number of wake-up signal bursts signaled in the predefined frames mapped to the different ones or combinations of the coverage classes is based on a required robustness of a transmission depending on the coverage classes, wherein the at least one wake-up signal burst is mapped to at least one bit of at least one training sequence of the multi-frame control channel to improve detection by the network device, wherein the at least one training sequence is different than a training sequence used for an access grant channel in the communication network, wherein the at least one burst is indicated by a sequence of tail symbols repeating the at least one bit, wherein a value of a tail or training symbol of the at least one wake-up signal burst depends on an occurrence or a non-occurrence of a paging request associated with a next paging occasion of a network device, wherein the at least one wake-up signal burst is divided into two halves and sent in one slot of the multi-frame control channel, wherein both of the two halves contain a pseudo random sequence, wherein the pseudo random sequence in a second half is a copy of the pseudo random sequence in a first half in case of an indication of the non-occurrence of the paging request, and wherein the pseudo random sequence in the second half is an inverse of the pseudo random sequence in the first half in case of an indication of the occurrence of the paging request or vice versa, wherein the signaling comprises two wake-up signal bursts, wherein a second one of the two wake-up signal bursts is sent in an opposite phase to a first one of the two wake-up signal bursts, wherein the wake-up signal burst is a copy of a burst in a preceding or following timeslot and wherein the indication of the occurrence or the non-occurrence of the paging request is carried by a wake-up signal burst's phase relative to a phase of the burst in the preceding or following timeslot, wherein there is sending, additional signaling comprising a coverage class or a range of coverage classes for operation in extended coverage, a paging group and a time frame, wherein the additional signaling is sent before a corresponding part of a paging channel and before conveying information about whether the corresponding part of the paging channel contains any paging for any mobile station, wherein the additional signaling is composed of at least one burst, and at least one of: the at least one wake-up signal is mapped in an extended coverage channel to one bit of information, and the additional signaling is transmitted on resources where a legacy mobile station may expect an access grant channel for the extended coverage channel, wherein the at least one wake-up signal corresponding to the next paging occasion comprises information of at least one subset of at least one of coverage class or paging group indicating whether there is a paging for the respective subset, in the corresponding next paging occasion, wherein information of subset comprises a subset range of MS identifiers.

A non-transitory computer-readable medium storing program code, the program code executed by at least one processor to perform the method of any of the paragraphs above.

A further example embodiment is an apparatus comprising the apparatus of the previous paragraphs, wherein the at least one wake-up signal comprises a burst transmission that is sent in a multi-frame control channel, wherein the multi-frame control channel is for extended coverage and wherein the at least one wake-up signal is mapped to at least one coverage class, wherein the multi-frame control channel comprises at least one of a paging block and an access grant block, wherein the multi-frame control channel comprises 51 data burst locations, wherein the at least one coverage class comprises EC-GSM-IoT coverage classes CC1, CC2, CC3, and CC4, wherein a number of the at least one wake-up signal burst is signaled in predefined frames, in particular predefined combinations of consecutive frames, mapped to different ones or combinations of the coverage classes, wherein the determining of the occurrence or non-occurrence of the paging request is based on paging requests for a paging group in the multi-frame control channel, wherein the number of wake-up signal bursts signaled in the predefined frames mapped to the different ones or combinations of the coverage classes is based on a required robustness of a transmission depending on the coverage classes, wherein the at least one wake-up signal burst is mapped to at least one bit of at least one training sequence of the multi-frame control channel to improve detection by the network device, wherein the at least one training sequence is different than a training sequence used for an access grant channel in the communication network, wherein the at least one burst is indicated by a sequence of tail symbols repeating the at least one bit, wherein a value of a tail or training symbol of the at least one wake-up signal burst depends on an occurrence or a non-occurrence of a paging request associated with a next paging occasion of a network device, wherein the at least one wake-up signal burst is divided into two halves and sent in one slot of the multi-frame control channel, wherein both of the two halves contain a pseudo random sequence, wherein the pseudo random sequence in a second half is a copy of the pseudo random sequence in a first half in case of an indication of the non-occurrence of the paging request, and wherein the pseudo random sequence in the second half is an inverse of the pseudo random sequence in the first half in case of an indication of the occurrence of the paging request or vice versa, wherein the signaling comprises two wake-up signal bursts, wherein a second one of the two wake-up signal bursts is sent in an opposite phase to a first one of the two wake-up signal bursts, wherein the wake-up signal burst is a copy of a burst in a preceding or following timeslot and wherein the indication of the occurrence or the non-occurrence of the paging request is carried by a wake-up signal burst's phase relative to a phase of the burst in the preceding or following timeslot, wherein there is sending, additional signaling comprising a coverage class or a range of coverage classes for operation in extended coverage, a paging group and a time frame, wherein the additional signaling is sent before a corresponding part of a paging channel and before conveying information about whether the corresponding part of the paging channel contains any paging for any mobile station, wherein the additional signaling is composed of at least one burst, and at least one of: the at least one wake-up signal is mapped in an extended coverage channel to one bit of information, and the additional signaling is transmitted on resources where a legacy mobile station may expect an access grant channel for the extended coverage channel, wherein the at least one wake-up signal corresponding to the next paging occasion comprises information of at least one subset of at least one of coverage class or paging group indicating whether there is a paging for the respective subset, in the corresponding next paging occasion, wherein information of subset comprises a subset range of MS identifiers.

In another example aspect of the invention, there is an apparatus comprising: means for determining signaling comprising at least one wake-up signal to indicate an occurrence or a non-occurrence of a paging request associated with a next paging occasion of a network device; and means for sending the signaling comprising the at least one wake-up signal toward a network device in a communication network, wherein the at least one wake-up signal is to cause the network device to determine whether to leave at the next paging occasion an energy saving sleep mode to receive the paging request.

In accordance with the example embodiments as described in the paragraph above, at least the means for determining and sending comprises a network interface, and computer program code stored on a computer-readable medium and executed by at least one processor.

In another example aspect of the invention there is a user equipment side apparatus comprising: at least one processor; and at least one memory including computer program code, where the at least one memory and the computer program code are configured, with the at least one processor, to cause the apparatus to at least: receive by a network device in a communication network at least one wake-up signal to indicate an occurrence or a non-occurrence of a paging request, wherein the at least one wake-up signal is for use by the network device to determine whether to leave at its next paging occasion an energy saving sleep mode to receive the paging request.

A further example embodiment is a method comprising: receiving by a network device in a communication network at least one wake-up signal to indicate an occurrence or a non-occurrence of a paging request, wherein the at least one wake-up signal is for use by the network device to determine whether to leave at its next paging occasion an energy saving sleep mode to receive the paging request.

A further example embodiment is a method comprising the method of the previous paragraph, wherein the at least one wake-up signal comprises a burst transmission that is received in a multi-frame control channel, wherein the multi-frame control channel is for extended coverage and wherein the at least one wake-up signal is mapped to at least one coverage class, wherein the multi-frame control channel comprises at least one of a paging block and an access grant block, wherein the multi-frame control channel comprises 51 data burst locations, wherein the at least one coverage class comprises EC-GSM-IoT coverage classes CC1, CC2, CC3, and CC4, wherein a number of the at least one wake-up signal burst is received in predefined frames mapped to different ones of the coverage classes, wherein the number of wake-up signal bursts received in the predefined frames mapped to the different ones of the coverage classes is based on a required robustness of a transmission depending on the coverage classes, wherein the number of the wake-up signal bursts for the at least one wake-up signal burst is based on distribution of a paging load across the coverage classes CC1, CC2, CC3, and CC4, wherein a wake-up signal burst of the at least one wake-up signal burst is mapped to at least one bit of at least one training sequence of the multi-frame control channel to improve detection by the network device, wherein the at least one training sequence is different than a training sequence used for an access grant channel in the communication network, wherein the at least one bit is indicated by tail symbols repeating the at least one bit of the at least one training sequence, wherein if the network device detects that the wake-up signal indicates a non-occurrence of a paging request, it will ignore a paging request sent to it in its next paging occasion, wherein there is estimating a correlation energy for each of the at least one training sequence; and determining the at least one training sequence based on the difference between the correlation energies of the each of the at least one training sequence, wherein the determining is using additional weight for wake up sequence to reduce a probability of false detection of a wake up signal as sleep signal, wherein the at least one wake-up signal burst is divided into two halves and sent in one slot of the multi-frame control channel, wherein both halves contain a pseudo random sequence, wherein a second half is a copy of a first half in case of a wake-up signal transmission, wherein a second one of the halves contains an inverse of a first half or vice versa in case of a go-to-sleep signal transmission, wherein there is performing cross-correlation of the first half with the second half of the burst: and determining the wake-up signal burst based on whether the real part of the cross-correlation exceeds a specific threshold value, wherein the signaling comprises two wake-up signal bursts, wherein a second one of the two wake-up signal bursts is received in an opposite phase to a first one of the two wake-up bursts, wherein two wake-up signal bursts are received, wherein a second one of the two wake-up signal bursts is sent in an opposite phase to a first one of the two wake-up signal bursts, wherein there is cross-correlating energy of a preceding wake-up signal burst and a threshold; and based on the energy of the preceding wake-up signal burst is below the threshold, then detecting the repeated wake-up signal burst, wherein the at least one wake-up signal corresponding to the next paging occasion comprises information of at least one subset of at least one of coverage class or paging group indicating whether there is a paging for the respective subset, in the corresponding next paging occasion, wherein information of subset comprises a subset range of MS identifiers, wherein there is determining whether to receive the paging block for the respective subset based on its MS identifier.

A non-transitory computer-readable medium storing program code, the program code executed by at least one processor to perform at least the method as described in the paragraphs above.

In yet another example aspect of the invention, there is an apparatus comprising: means for receiving by a network device in a communication network at least one wake-up signal to indicate an occurrence or a non-occurrence of a paging request, wherein the at least one wake-up signal is for use by the network device to determine whether to leave at its next paging occasion an energy saving sleep mode to receive the paging request.

In accordance with the example embodiments as described in the paragraph above, at least the means for receiving comprises a network interface, and computer program code stored on a computer-readable medium and executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, a new burst format and sequence design to indicate the page presence in upcoming EC-CCCH blocks is provided which can be fit within few bursts but also provides reliable detection performance in extended coverage condition. The new burst format allows early detection of the paging indication with sufficient detection performance through one or two bursts. The new design also achieves minimum impact to MS of earlier release attempting to receive the bursts which correspond to the paging indication channel.

In accordance with the example embodiments there is at least one signaling design comprising at least one burst which can convey the wakeup/sleep information, with fewer bursts than would be needed for receiving directly a paging block but with high reliability for the detection. Further, in accordance with the example embodiments of the invention a burst format which is expected to have minimum impact to legacy users is proposed. In addition, the signaling in accordance with the example embodiments of the invention may include different wake-up signal (WUS) realizations for different CCs (coverage classes) to further improve the efficiency of the WUS based paging mechanism.

According to section 5.1.5 in 3GPP TS 27.010 V14.0.0 (2017-03) for power control services it might be desirable for either the DTE or the DCE to enter a power saving mode with a minimum of communication activities taking place. Services that support this functionality are the Sleep services and the Wakeup services. According to section 5.1.5.1 of this 3GPP document the Wakeup service indication primitive is sent to the upper layer when the receiving unit receives a request to wake up from the power saving state. When the receiving device is ready to resume operation on the multiplexer channel this is indicated to the receiving unit by means of the response primitive.

In general user equipment (UE) are configured with a transmission duration and/or repetitions of a WUS by higher layers. The WUS is decoded by UE after cell synchronization by receiving extended coverage synchronization channel (EC-SCH).

It is noted that for NB-IoT there is also work being done on a new WUS design. However, it is submitted that when this new WUS design is sent in some subframes it cannot be used for legacy users as legacy users would not understand this format. In this regard the example embodiments of the invention provide a signaling format which can reuse an existing burst structure so that impact to legacy MS is minimum.

Example embodiments of the invention relate to a burst design which can convey wakeup and/or go-to-sleep signaling with one or only a few bursts and with high reliability for the detection of the signaling. Further, example embodiments of the invention relate to a novel burst format which has minimum impact to legacy users, and also to novel operations using different WUS realizations for different CCs (coverage classes) to further improve an efficiency of a WUS based paging mechanism.

Figure 6:
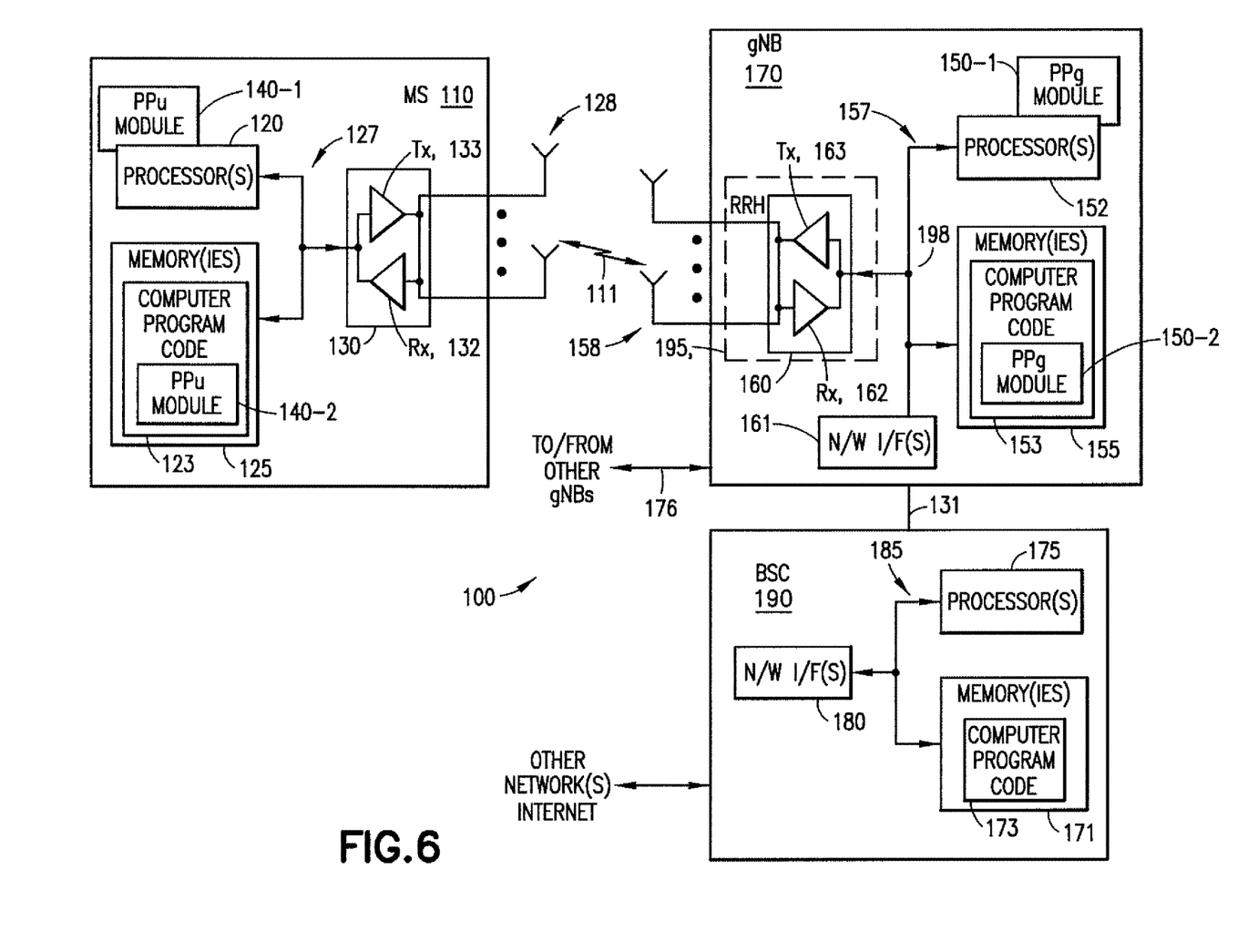
FIG. 6 shows a high level block diagram of various devices used in carrying out various aspects of the invention.

Before describing the example embodiments of the invention in further detail reference is made to FIG. 6. FIG. 6 shows a block diagram of one possible and non-limiting exemplary system in which the exemplary embodiments may be practiced. In FIG. 6, a mobile station (MS) 110 is in wireless communication with a wireless network 100. A UE is a wireless or wired, typically mobile device that can access a wireless network. The MS 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The MS 110 may include a PPu module 140 e.g. a page processor module for UE (PPu) which is configured to perform at least the paging related signal detection and processing of the example embodiments of the invention as described herein. The PPu module 140 comprising one of or both parts 140-1 and/or 140-2, which may be implemented in a number of ways. The PPu module 140 may be implemented in hardware as PPu module 140-1, such as being implemented as part of the one or more processors 120. The PPU module 140-1 may be implemented also as an integrated circuit or through other hardware such as a programmable gate array. In another example, the PPu module 140 may be implemented as PPu module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The MS 110 communicates with gNB 170 via a wireless link 111.

The gNB 170 (NR/5G Node B or possibly an evolved NB) is a base station (e.g., for LTE, long term evolution) that provides access by wireless devices such as the MS 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a PPg module 150 e.g. a page processor module for gNB (PPg) which is configured to perform at least the paging related signaling and processing of the example embodiments of the invention as described herein. The PPg module 150 comprising one of or both parts 150-1 and/or 150-2, which may be implemented in a number of ways. The PPg module 150 may be implemented in hardware as PPg module 150-1, such as being implemented as part of the one or more processors 152. The PPg module 150-1 may be implemented also as an integrated circuit or through other hardware such as a programmable gate array. In another example, the PPg module 150 may be implemented as PPg module 150-2, which is implemented as computer program code 153 and is executed by the one or more processors 152. For instance, the one or more memories 155 and the computer program code 153 are configured to cause, with the one or more processors 152, the gNB 170 to perform one or more of at least the paging related signaling and processing operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH. The RRH can be part of a base transceiver station (BTS). The RRH can have one or more buses 157 that could be implemented in part as fiber optic cable to connect the other elements of the gNB 170 to the remote radio head (RRH) 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a base station and/or RAN controller (BSC) 190 that can include paging control functionality, and which provides connectivity with a further network, such as a telephone network and/or a data communications network (e.g., the Internet). The gNB 170 is coupled via a link 131 to the BSC 190. The link 131 may be implemented as, e.g., an S1 interface. The BSC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the BSC 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the MS 110, gNB 170, and other functions as described herein.

It is noted that any reference to terms used in this specification or labels in the Figures which are associated with a particular communication technology are not limiting (e.g., gNB or an eNB). The Example embodiments of the invention as described herein can be performed using devices operating in GSM/EDGE, LTE, and/or 5G, as well as any devices e.g., gNB, eNB, UE, and/or MS operating in any other communication technologies.

In general, the various embodiments of the mobile station 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, and/or Internet appliances permitting wireless Internet access and browsing with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium or other device that may be any media or means that can contain or store the instructions for use by or in connection with an instruction execution system, apparatus, or device, such as a computer.

Wake-Up Signal (WUS) Resource Allocation

To indicate whether the CIoT device needs to wake up or sleep for its next paging occasion, a wake-up signal using a new burst format needs to be introduced within the control channel multi-frame structure. The wake-up signal is a signal indicating that at least one MS is paged in a corresponding coverage class or in a set of coverage classes, and in another example embodiment of the invention the signal is indicating presence of paging requests in a time interval of two or four of 51-multiframes depending on the coverage class (i.e. two 51-multiframes for a MS using coverage class CC2 or CC3 and four 51-multiframes for a MS using CC4). The signal is sent using FN 15-18 in the common control channel for extended coverage, which are currently specified to be used for mapping EC-AGCH for CC1 users only.

The coverage classes definition as described in 3GPP TS43.064 version 14.2.0 (2017-06). A predefined number of logical channel specific blind physical layer transmissions is used to support a certain level of extended coverage. For some logical channels, the number of blind physical layer transmissions can vary depending on the coverage extension required. Four different Coverage Classes are defined, each one approximated with a level of extended coverage compared to GPRS/EGPRS denoted as CC1, CC2, CC3 and CC4 respectively. CC1 is more or less the normal coverage, i.e. the GSM coverage of up to 3GPP Rel-12. CC4 is, on the DL, the highest coverage class, and it uses the largest number of blind physical layer transmissions (repeated transmission of the same signal) of the DL coverage classes.

To avoid the impact to downlink signaling failure for a legacy CIoT device checking for its page on the paging occasion in its next paging block, the new signal, containing one single or a set of bursts, needs to be placed within TDMA frames which have minimum or reduced impact to the legacy CIoT device of an earlier release.

Presently, the minimum EC-PCH/EC-AGCH block is a 2-burst block, allowing up to 16 EC-PCH blocks and 20 EC-AGCH blocks in one 51-multiframe. The EC-Random Access Channel (EC-RACH) is mapped onto the UL thus potentially leading to collision of different coverage classes on the same resources. For data traffic channels, a combination of blind physical layer repetitions and incremental redundancy (HARQ type II) presently may be used. In addition, in extended coverage: Blind physical layer transmissions (totally 16 times) and Hybrid Automatic Retransmission Request (HARQ) (4 times) repetitions can be used to reach 20 dB extended coverage compared to legacy GPRS.

In accordance with the example embodiments, in order to reduce the impact to CIoT devices such as a legacy CIoT devices, the WUS burst(s) can be placed on frame numbers (FNs) FN15-FN18 on the 51-multiframe which are at this time specified to be used for the mapping of EC-AGCH for CC1 users only, but not for mapping of EC-PCH blocks.

The estimated paging rate (which corresponds to the rate of network commands to the device) is 1.7 page/second across all the devices, based on the assumption of 51,000 devices per cell as per traffic model and ratio of network commands to devices (20%) indicated in 3GPP TR 45.820 version 13.1.0 (2015-11). With only 10% of devices located in extended coverage, the number of pages for devices in extended coverage will be 0.2 page/second. In turn this refers to 2 pages in average to devices in extended coverage for every 10 seconds.

Further, with infrequent network command/paging loads, for many of paging occasions UE reads the paging channel to find there is no page associated to it. To reduce the additional power consumption for paging channel reception, a new paging indication channel is required. In accordance with an example embodiment, for the above traffic profile a paging WUS is being sent once in every 4*51 MF to indicate presence of a paging request to a device in extended coverage, requiring the transmission in CC2, CC3 or CC4 is suitable. Having separate paging WUS indications for CC2, CC3 and CC4 can help to improve the paging efficiency as a coverage class specific WUS is achieved.

Figure 1:
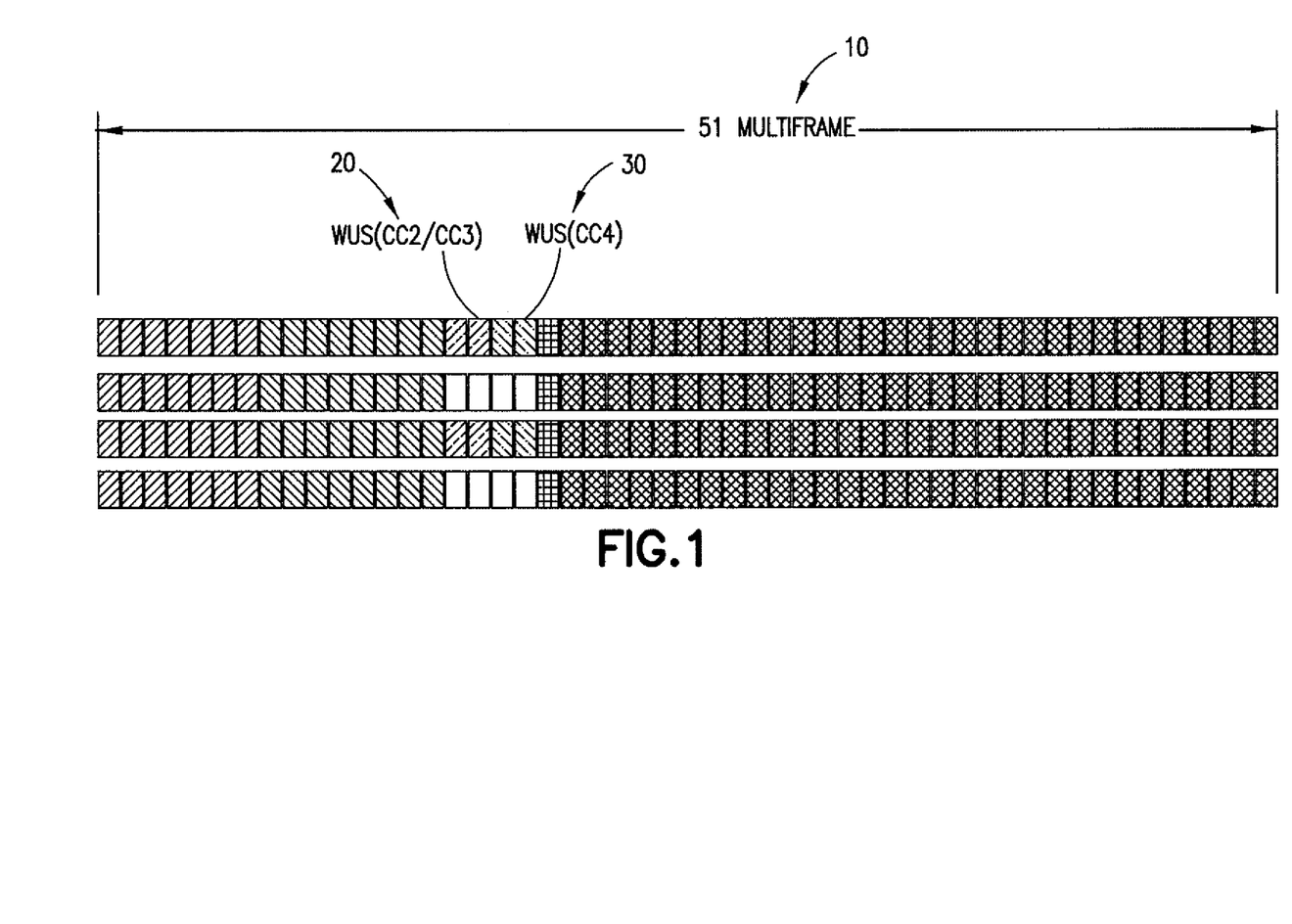
FIG. 1 shows a placement of EC-WUS in control channel multiframe structure with a given periodicity in a multiframe.
Figure 2:
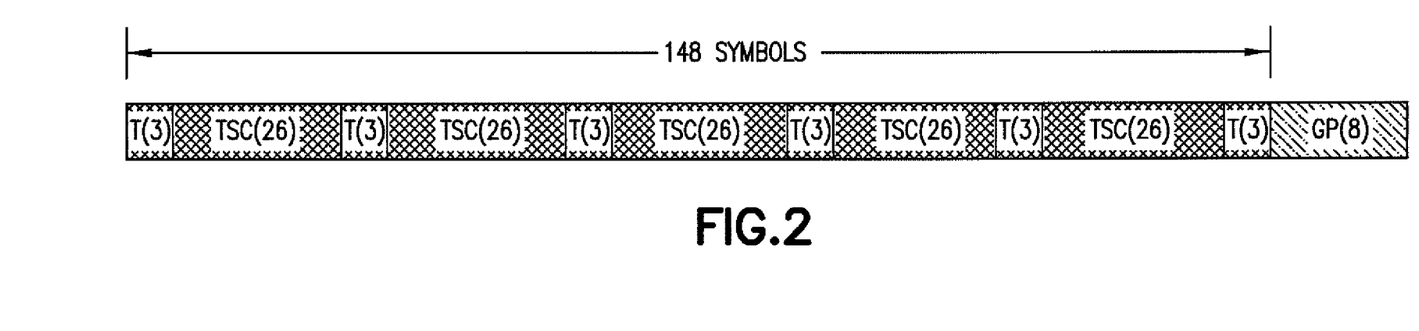
FIG. 2 shows a burst format in accordance with the example embodiments of the invention using coherent transmission of training sequence multiple times within single burst.

FIG. 2 shows a burst format for option 1 as discussed below in accordance with the example embodiments of the invention. FIG. 2 shows coherent transmission of training sequence multiple times within a single burst. It is shown in FIG. 1 a placement of the EC-WUS in control channel multiframe structure with periodicity of 4*51 MF in accordance with an example embodiment of the invention. As shown in FIG. 1 the multiframe 10 includes 51 frames with FNs 0-50. As shown in FIG. 1, the EC-WUS for CC4 Devices is placed on FN17-FN18 for every 4*51 MF, and a sequence indicating Wake up/Sleep is repeated in two successive TDMA frames. The indication is meant for the two CC4 blocks mapped to the 4*51 MF following the WUS. EC-WUS for CC2/CC3 devices is placed in FN15-FN16 for every 2*51 MF. Sequence indicating Wake up/Sleep is repeated in two successive TDMA frames. In addition, the indication can be meant for the CC2/CC3 blocks mapped to the 2*51 MF carrying the WUS. Separate WUS for CC4 and the set of CC2/CC3 in accordance with the example embodiments improves the efficiency of the WUS based paging mechanism as the presence of page for a lower CC (such as CC2 or CC3) does not wake up higher CC (such as CC4) and vice versa.

Further, in accordance with an example embodiment of the invention there can be for a burst format option two separate WUS configured for CC4 and CC2/CC3. This separation is required if there is more paging for all higher CC above CC1. In accordance with the example embodiments, in a case where the paging load is lesser then single WUS within 4*51 MF can be sufficient to cover all CC. The SIB can indicate via a single bit whether a WUS is intended for all higher CC or for two separate WUS for CC4 and CC2/CC3

In accordance with an example embodiment of the invention a separate WUS is provided by a network node such as a base station for CC2/CC3 and CC4. The WUS occasions for different coverage classes may change based on the distribution of a paging load across the coverage classes (CC1, CC2, CC3, and CC4). In another example embodiment, at low paging load, a single WUS for all coverage classes may be configured, e.g. in FN 15-16, and thus allow for EC-AGCH transmission in FN 17-18. The WUS occasions are indicated by the system information broadcast. Then in accordance with the example embodiments a network device such as a UE or MS can determine a number of WUS occasions according to its coverage class from the system information broadcast.

WUS Sequence/Burst Design for EC-GSM-IoT

In accordance with example embodiments of the invention there are following three options which can be considered for the WUS Design.

Option 1: Training Sequence Based Correlation

Option 1 includes:

Two of the training sequences which are not currently used in the network but defined in specification for downlink can be chosen to indicate Wake Up and Sleep Indication;

The training sequence can be coherently transmitted multiple times within the normal burst (fitting inside the 148 bits) to improve the detection performance at the CIoT device; and/or 5 times transmission of 26 bit training sequence per burst is one possible design for this option.

FIG. 2 shows a burst format for Option 1 which uses coherent transmission of training sequences (TSCs) multiple times within a single burst.

For this option 1, the CIoT device estimates the correlation energy for both the training sequences communicated to it by a network and identifies the sequence from the network based on the difference between the correlation energies. The detection mechanism can have additional weightage for wake up sequence to reduce the probability of false detection of wake up as "go back to sleep" as this will lead to missing of paging messages. This risk is because a CIoT device which believes to have received a "go back to sleep" indication, i.e. an indication about a non-occurrence of a paging request, concludes that it need not check the paging channel during its next paging occasion. Hence the CIoT device will remain in an energy saving state during its next paging occasion and thus ignore a paging request sent to it during its next paging occasion.

Option 2: Split-Burst Transmission

Option 2 includes:

In this option, a single burst is divided into two halves and sent in one time slot. Each half transmits the same pseudo random sequence in case of sleep signal transmission. Second half transmits the inverse of the first half transmission in case of wake up signal transmission; and/or The receiver of the CIoT device performs cross-correlation of first half with second half of the burst (fixed time offset of e.g. 148/2=74 symbol periods), and decides on the transmitted bit based on whether the real part of the cross-correlation (normalized by the energy of the corresponding received signal) exceeds specific threshold value. The threshold can be configured to result in a sufficiently low probability of overlooking a wake-up command.

This option 2 is expected to perform better under interference situations with adverse interfering bit sequences because it does not rely on any correlation to fixed sequence. Correlation check against fixed known sequence will have lesser performance for interference situations. Option 2 is sensitive to high Doppler shifts and is robust against multipath propagation at least for the reason that the energy of all channel taps is combined.

Figure 3:
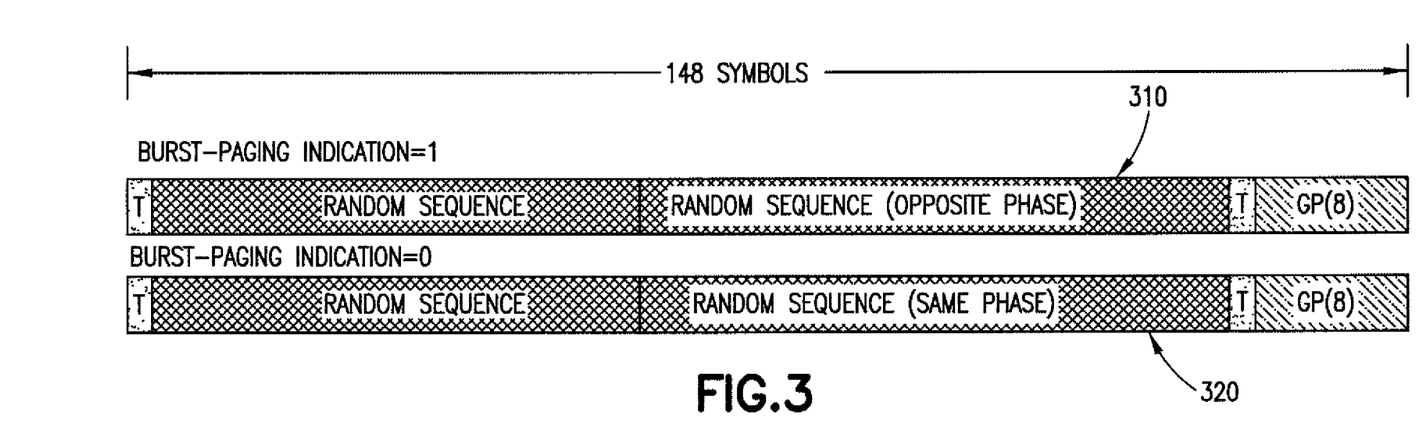
FIG. 3 shows a burst format in accordance with the example embodiments of the invention using a random sequence across two parts of the burst, the second part being the same or the inverted bit sequence of the first part, and the length of the tail symbols may be zero.

FIG. 3 shows a burst format for option 2 as described herein. As shown in FIG. 3 there is a random sequence in two parts of the burst. The burst is long 148 symbols and would encompass the ending tail bits. The random sequence may in practical implementations be a pseudo random sequence. The upper burst 310 in FIG. 3 shows a burst for signalling wake-up or sleep information. As shown in FIG. 3 there is a left part of the upper burst 310 which includes a first half burst and a right part of the upper burst 310 which includes a second half burst. The burst's second half includes a repetition of the random sequence in the first half with an opposite phase compared with the first half. The lower part of FIG. 3 shows a burst 320 for signalling a sleep information. It also has a left part which includes a first half burst and a right part which includes a second half burst. The second half of the lower burst 320 includes a repetition of the random sequence in the first half of burst 320 with a same phase as in the first half. (Of course, it is also possible to map the wake-up and sleep information the other way around to the bursts 310 and 320.) An advantage of this option is that it is robust against timing errors including errors in a range of a very few symbol periods and a frequency error within the allowed limit.

Option 3: Repetition of the Preceding Burst with the Same or the Opposite Phase

Option 3 includes:

In this option 3, the preceding (or following) burst is sent with the same phase (0°, in general x° with x<180), or the opposite phase (180°, in general x°+180°). The difference to option 2 is that here the sequences that are correlated with one another have twice the length—an entire normal burst instead of half of a normal burst. This approach increases the energy by 3 dB in the case of GMSK, but if the repeated burst uses a modulation scheme to which a Tx power back-off is applied, the back-off offsets this gain of 3 dB. Furthermore, due to more than twice the time offset applied in the cross-correlation, the correlation result is even more sensitive to a high Doppler shift; and The receiver of the CIoT device cross-correlates the Rx signal part corresponding to the timeslot carrying the WUS with the Rx signal part corresponding to the preceding (or following) burst (fixed time offset of e.g. 157 symbol periods between TN0 and TN1). In the case of x=0 (see the bullet point above), the bit detection is based on the comparison of the real part of the cross-correlation (normalized by the energy of the corresponding received signal) and a threshold. If the result of the first of the two subsequent TDMA frames (e.g. FN15) is not reliable enough, the signal needs to be detected also in the following TDMA frame (e.g. FN16), and a combined decision may be performed if e.g. none of the individual decisions is reliable enough.

Figure 4:
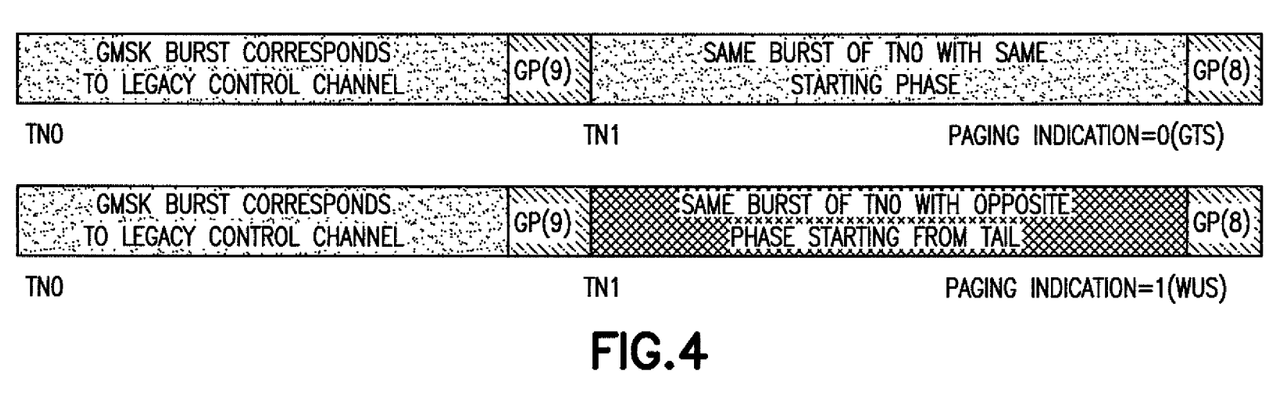
FIG. 4 shows a burst format in accordance with the example embodiments of the invention using burst content of TN0 as a reference transmission.

FIG. 4 shows a burst format for Option 3 as described herein. As shown in FIG. 4 a burst content of TN0 is used as reference transmission. As shown in FIG. 4 transmission of new paging indication channel does not impact the reception of TN0 control channels for legacy users because TN0 content is repeated in TN1 with same or different phase depending on the paging indication value to be sent. This option appears as an overlaid CDMA transmission across TN0 and TN1. Overlaid CDMA code 00 which means same phase is used when paging indication is 0, overlaid CDMA code 01 which corresponds to opposite phase is used for the burst transmissions if paging indication is 1. An advantage is that suitable detection can be achieved considering the low level of variation of the paging indication channel between two adjacent timeslots.

Figure 5:
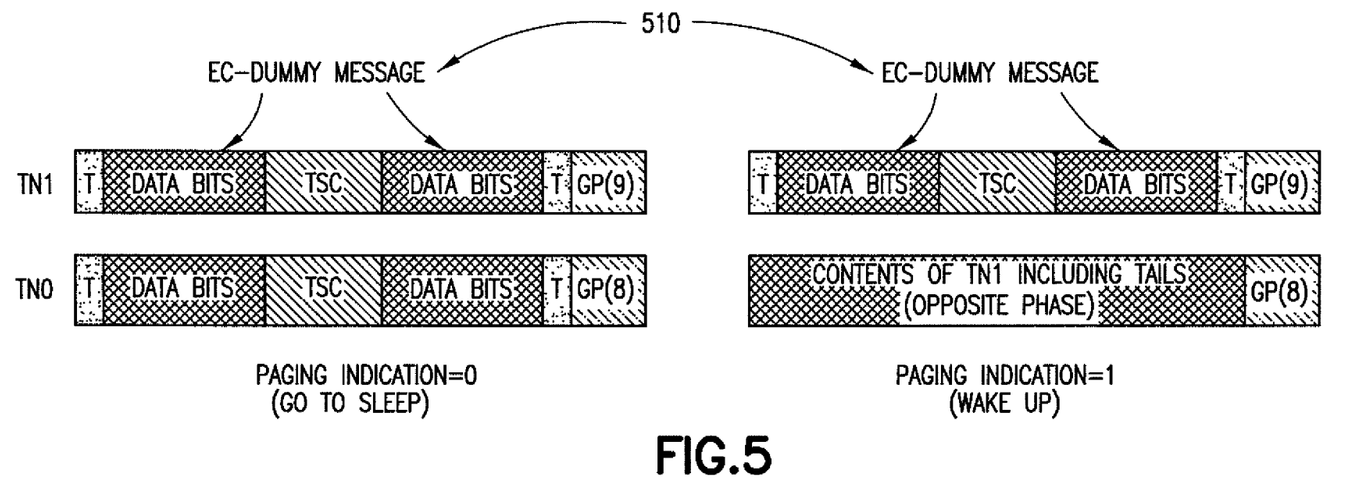
FIG. 5 shows a burst format in accordance with the example embodiments of the invention using burst content of TN1 as reference transmission.

In addition, FIG. 5 shows another burst format in accordance with the example embodiments as disclosed herein for Option 3. As shown in FIG. 5 a TN1 burst carries valid EC-DUMMY message so that it does not create impact to EC-GSM-IoT users such as legacy users attempting to receive this burst as EC-AGCH block. Another option for burst format is to use TN2 instead of TN0 for the second burst of the paging indication channel. As shown in FIG. 5, a network node such as a base station sends the encoded bits of EC DUMMY message 510 in the data bits of a burst in TN1 and the same content is transmitted in the burst in adjacent (TN0/TN2) timeslot, if there is no page scheduled in the upcoming EC-CCCH blocks a Paging indication can equal 0. If the paging indication is set to 1, base station transmits the contents using opposite phase in the burst in the adjacent timeslot. An advantage of the opposite phasing includes that there is no need to transmit a training sequence for a phase reference, and that the option is robust against timing errors including errors in a range of a very few symbol periods and a frequency error within the allowed limit.

In an embodiment, the range of MS identifiers that can occur during a paging occasion/block is split in a number of subsets, e.g. two subsets. The wake-up-signal corresponding to the paging occasion/block includes information for each of the subsets about whether there is a paging for the respective subset in the corresponding next paging occasion/block. One way to do so in the case of 2 subsets is to use a first burst, e.g. in FN15, to provide a wake-up/sleep information for the first subset, and to use a second burst, e.g. in FN16, to provide a wake-up/sleep information for the second subset. (With this approach, using FN15-18 would allow for supporting even the distinction between 4 subsets, each FN carrying a separate WUS for one of the subsets.) Another possibility is, based on option 3, to carry the information about whether there is a paging for any MS in the corresponding paging occasion/block in a relative phase between adjacent bursts, and in the case that there is at least one paging in the corresponding paging occasion/block, to indicate in the content of the adjacent bursts the subset(s) for which there is a paging.

WUS for PEO Operation

As there is no blind physical layer transmission for PEO operation, the energy efficiency for introduction of WUS for PEO operation is minimum if one WUS is mapped to one paging group. Considering one paging block consists of 4 bursts introducing WUS of 1 burst for paging block reception will only have a tow energy efficiency improvement, the more so as under good Rx conditions, only one or two of the bursts of a paging block need to be received. If more bits can be conveyed, e.g. in a single burst or in a sequence of two bursts of the WUS, where each bit indicates the paging for a specific paging group, the efficiency is expected to improve for PEO MS under bad Rx conditions.

One possible implementation for WUS for PEO operation is described below:

Each burst of the CCCH block in FN6 to FN9, using a different training sequence than used for CCCH, e.g. adopting option 1 or option 2 above, and a new encoding of data for the normal burst, conveys two bits of information corresponding to paging indication of one of the eight PCH blocks in FN11 to FN49 in the same or following 51-multiframe (i.e. 2 bits indicate upcoming pagings in two successive PCH blocks). In this way, a single CCCH block of 4 bursts is reserved for sending paging indications for 8 PCH blocks within the same or following 51-multiframe; and/or For option 1 different TSC's are used. In addition the second bit may be indicated by the Tail symbols (there are usually 3 tail symbols at either end of a burst, and in the case of GMSK, a symbol carries one bit), e.g. either repeating the first 3 TSC bits or the last 3 TSC bits or any other suitable 3 bit part of the TSC (see FIG. 1). A similar approach can be used for option 2 if 3 tail bits at start and end of the burst are included, that repeat a part of the pseudo-random-sequence.

Some Key aspects of the invention for WUS Design for EC-GSM are summarized as follows:

Placement of new WUS burst on the EC-AGCH block positions (instead of positions that can be used for EC-PCH) to mitigate false decoding of EC-CCCH for legacy MS/CIoT device;

Number of WUS and mapping of different higher coverage classes (higher CCs) to WUS resources as configurable parameter, signaled to the mobile stations by system information broadcast where the mapping is controlled (by the mobile network) based on paging load of the system (i.e. applying no CC specific mapping for higher CCs (CC2 to CC4) or mapping of subsets of higher CCs to one indication (CC2+CC3; CC4) or higher CC specific mapping);

New burst design based on specified but not used TSC with multiple coherent transmissions of this TSC within the normal burst;

Alternatively, repetition of a burst or half of a burst with the same or the opposite phase in the second part (i.e. second part of the same burst or second part in a successive burst) where the MS/CIoT device detects the single bit based on a correlation between the first and the second part; and Conveying a two bit indication in the WUS to point to an upcoming paging in two successive paging blocks using specific tail bits.

In accordance with the example embodiments of the invention as described herein there is robust signaling of at least a single bit per timeslot in extended coverage. The example embodiments of the invention work to minimize the number of blind transmissions in order to save capacity on channels such as the EC-CCCH and to minimize a number of bursts that a UE or MS has to receive when it needs to check frequently whether it is paged.

To this end, the example embodiments of the invention propose in option 3 to simply transmit in timeslot number 1 the copy of a burst of timeslot number 0 or of timeslot number 2. The single bit that needs to be transmitted is carried by the relative phase of the copy, compared with the timeslot from which the burst is copied.

Benefits of the method in accordance with the example embodiments of the invention include:

A Number of WUS and a mapping of different higher coverage classes (higher CCs) to WUS resources can be communicated with network devices using one or more configurable parameters such as from a system information broadcast, where the mapping is controlled based on paging load of the system (i.e. applying no CC specific mapping for higher CCs (CC2 to CC4) or mapping of subsets of higher CCs to one indication (CC2+CC3; CC4) or higher CC specific mapping);

As for option 3 a phase reference for the detection is anyways transmitted on a preceding or following Burst such that there is no need to transmit a training sequence for a phase reference;

Differential detection is a suitable detection method for a MS because of the low level of variation of the propagation channel between two adjacent timeslots. During the time offset of 577 μs between the timeslots, a MS at 50 km/h (the fastest speed assumed for extended coverage) and a wavelength of $\lambda=16$ cm (PCS 1900) moves by 0.8 cm which is only about $\lambda/20$;

The MS only needs to calculate the real part of a complex-valued correlation between the 2 bursts—neither channel estimation nor equalization nor channel decoding is needed;

As for options 2 and 3 the method in accordance with the example embodiments is robust against timing errors including errors in a range of a very few symbol periods and a frequency error within the allowed limit of 0.1 ppm, e.g., in particular at GSM 850 and GSM 900;

The frame numbers are chosen such that an EC-AGCH decoding failure for legacy EC-GSM-IoT MS is tolerable when the new information is transmitted; and Additional energy saving benefit of up to 10-15% can be achieved with the new signaling in accordance with the example embodiments.

Figure 7A:
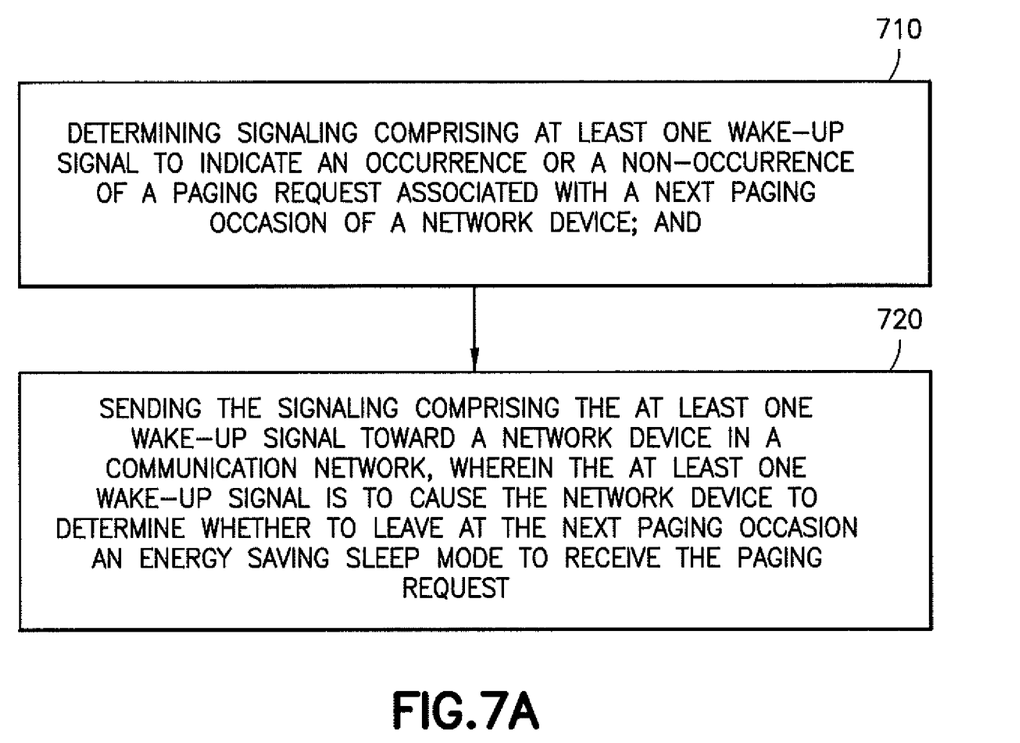
FIGS. 7A and 7B each show a method in accordance with example embodiments of the invention which may be performed by an apparatus.

FIG. 7A illustrates operations which may be performed by a network node such as, but not limited to, a network node gNB 170 as in FIG. 6 or an eNB. As shown in step 710 of FIG. 7A there is determining signaling comprising at least one wake-up signal to indicate an occurrence or a non-occurrence of a paging request associated with a next paging occasion of a network device. Then as shown in step 720 of FIG. 7A there is sending the signaling comprising the at least one wake-up signal toward a network device in a communication network, wherein the at least one wake-up signal is to cause the network device to determine whether to leave at the next paging occasion an energy saving sleep mode to receive the paging request.

In accordance with the example embodiments as described in the paragraph above, the at least one wake-up signal comprises a burst transmission that is sent in a multi-frame control channel.

In accordance with the example embodiments as described in the paragraphs above, the multi-frame control channel is for extended coverage and wherein the at least one wake-up signal is mapped to at least one coverage class.

In accordance with the example embodiments as described in the paragraphs above, the multi-frame control channel comprises at least one of a paging block and an access grant block.

In accordance with the example embodiments as described in the paragraphs above, the multi-frame control channel comprises 51 data burst locations.

In accordance with the example embodiments as described in the paragraphs above, the at least one coverage class comprises EC-GSM-IoT coverage classes CC1, CC2, CC3, and CC4.

In accordance with the example embodiments as described in the paragraphs above, a number of the at least one wake-up signal burst is signaled in predefined frames, in particular predefined combinations of consecutive frames, mapped to different ones or combinations of the coverage classes.

In accordance with the example embodiments as described in the paragraphs above, the determining of the occurrence or non-occurrence of the paging request is based on paging requests for a paging group in the multi-frame control channel.

In accordance with the example embodiments as described in the paragraphs above, the number of wake-up signal bursts signaled in the predefined frames mapped to the different ones or combinations of the coverage classes is based on a required robustness of a transmission depending on the coverage classes.

In accordance with the example embodiments as described in the paragraphs above, the at least one wake-up signal burst is mapped to at least one bit of at least one training sequence of the multi-frame control channel to improve detection by the network device.

In accordance with the example embodiments as described in the paragraphs above, the at least one training sequence is different than a training sequence used for an access grant channel in the communication network.

In accordance with the example embodiments as described in the paragraphs above, the at least one burst is indicated by a sequence of tail symbols repeating the at least one bit.

In accordance with the example embodiments as described in the paragraphs above, a value of a tail or training symbol of the at least one wake-up signal burst depends on an occurrence or a non-occurrence of a paging request associated with a next paging occasion of a network device.

In accordance with the example embodiments as described in the paragraphs above, the at least one wake-up signal burst is divided into two halves and sent in one slot of the multi-frame control channel, wherein both of the two halves contain a pseudo random sequence, wherein the pseudo random sequence in a second half is a copy of the pseudo random sequence in a first half in case of an indication of the non-occurrence of the paging request, and wherein the pseudo random sequence in the second half is an inverse of the pseudo random sequence in the first half in case of an indication of the occurrence of the paging request or vice versa.

In accordance with the example embodiments as described in the paragraphs above, the signaling comprises two wake-up signal bursts, wherein a second one of the two wake-up signal bursts is sent in an opposite phase to a first one of the two wake-up signal bursts.

In accordance with the example embodiments as described in the paragraphs above, the wake-up signal burst is a copy of a burst in a preceding or following timeslot and wherein the indication of the occurrence or the non-occurrence of the paging request is carried by a wake-up signal burst's phase relative to a phase of the burst in the preceding or following timeslot.

In accordance with the example embodiments as described in the paragraphs above, there is sending, additional signaling comprising a coverage class or a range of coverage classes for operation in extended coverage, a paging group and a time frame, wherein the additional signaling is sent before a corresponding part of a paging channel and before conveying information about whether the corresponding part of the paging channel contains any paging for any mobile station, wherein the additional signaling is composed of at least one burst, and at least one of: the at least one wake-up signal is mapped in an extended coverage channel to one bit of information, and the additional signaling is transmitted on resources where a legacy mobile station may expect an access grant channel for the extended coverage channel.

In accordance with the example embodiments as described in the paragraphs above, the at least one wake-up signal corresponding to the next paging occasion comprises information of at least one subset of at least one of coverage class or paging group indicating whether there is a paging for the respective subset, in the corresponding next paging occasion, wherein information of subset comprises a subset range of MS identifiers.

Figure 7B:
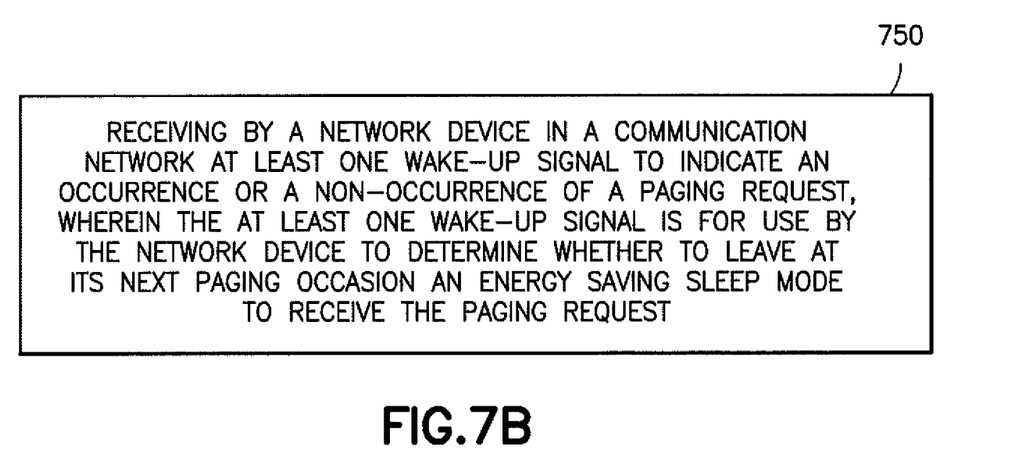

FIG. 7B illustrates operations which may be performed by a network node such as, but not limited to, a network device UE 110 as in FIG. 6 or an MS. As shown in step 750 of FIG. 5B there is receiving by a network device in a communication network at least one wake-up signal to indicate an occurrence or a non-occurrence of a paging request, wherein the at least one wake-up signal is for use by the network device to determine whether to leave at its next paging occasion an energy saving sleep mode to receive the paging request.

In accordance with the example embodiments as described in the paragraph above the at least one wake-up signal comprises a burst transmission that is received in a multi-frame control channel.

In accordance with the example embodiments as described in the paragraphs above the multi-frame control channel is for extended coverage and wherein the at least one wake-up signal is mapped to at least one coverage class.

In accordance with the example embodiments as described in the paragraphs above, the multi-frame control channel comprises at least one of a paging block and an access grant block.

In accordance with the example embodiments as described in the paragraphs above, the multi-frame control channel comprises 51 data burst locations.

In accordance with the example embodiments as described in the paragraphs above the at least one coverage class comprises EC-GSM-IoT coverage classes CC1, CC2, CC3, and CC4.

In accordance with the example embodiments as described in the paragraphs above, a number of the at least one wake-up signal burst is received in predefined frames mapped to different ones of the coverage classes.

In accordance with the example embodiments as described in the paragraphs above, the number of wake-up signal bursts received in the predefined frames mapped to the different ones of the coverage classes is based on a required robustness of a transmission depending on the coverage classes.

In accordance with the example embodiments as described in the paragraphs above, the number of the wake-up signal bursts for the at least one wake-up signal burst is based on distribution of a paging load across the coverage classes CC1, CC2, CC3, and CC4.

In accordance with the example embodiments as described in the paragraphs above, a wake-up signal burst of the at least one wake-up signal burst is mapped to at least one bit of at least one training sequence of the multi-frame control channel to improve detection by the network device.

In accordance with the example embodiments as described in the paragraphs above, the at least one training sequence is different than a training sequence used for an access grant channel in the communication network.

In accordance with the example embodiments as described in the paragraphs above, the at least one bit is indicated by tail symbols repeating the at least one bit of the at least one training sequence.

In accordance with the example embodiments as described in the paragraphs above, the network device detects that the wake-up signal indicates a non-occurrence of a paging request, it will ignore a paging request sent to it in its next paging occasion.

In accordance with the example embodiments as described in the paragraphs above, there is estimating a correlation energy for each of the at least one training sequence; and determine the at least one training sequence based on the difference between the correlation energies of the each of the at least one training sequence, wherein the determining is using additional weight for wake up sequence to reduce a probability of false detection of a wake up signal as sleep signal.

In accordance with the example embodiments as described in the paragraphs above, the at least one wake-up signal burst is divided into two halves and sent in one slot of the multi-frame control channel, wherein both halves contain a pseudo random sequence, wherein a second half is a copy of a first half in case of a wake-up signal transmission, and wherein a second one of the halves contains an inverse of a first half or vice versa in case of a go-to-sleep signal transmission.

In accordance with the example embodiments as described in the paragraphs above, there is performing cross-correlation of the first half with the second half of the burst: and determining the wake-up signal burst based on whether the real part of the cross-correlation exceeds a specific threshold value.

In accordance with the example embodiments as described in the paragraphs above, the signaling comprises two wake-up signal bursts, wherein a second one of the two wake-up signal bursts is received in an opposite phase to a first one of the two wake-up bursts.

In accordance with the example embodiments as described in the paragraphs above, two wake-up signal bursts are received, wherein a second one of the two wake-up signal bursts is sent in an opposite phase to a first one of the two wake-up signal bursts.

In accordance with the example embodiments as described in the paragraphs above, there is cross-correlating energy of a preceding wake-up signal burst and a threshold; and based on the energy of the preceding wake-up signal burst is below the threshold, then detecting the repeated wake-up signal burst.

In accordance with the example embodiments as described in the paragraphs above, the at least one wake-up signal corresponding to the next paging occasion comprises information of at least one subset of at least one of coverage class or paging group indicating whether there is a paging for the respective subset, in the corresponding next paging occasion, wherein information of subset comprises a subset range of MS identifiers, wherein the at least one memory including the computer program code is configured to cause the apparatus to: determine whether to receive the paging block for the respective subset based on its MS identifier.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
at least one processor; and
at least one non-transitory memory storing instructions, that when executed by the at least one processor, cause the apparatus to at least:
receive, by a network device of a communication network, information comprising at least one wake-up signal associated with an occurrence or a non-occurrence of a paging request of a next paging occasion in the communication network;
identify whether the at least one wake-up signal of the information is for the network device; determine, based on the information comprising at least one wake-up signal and based on identifying that the at least one wake-up signal is for the network device, whether to leave, at the next paging occasion, an energy saving sleep mode to receive the paging request,
wherein the at least one wake-up signal comprises a burst format transmission that is sent in a multi-frame control channel,
wherein the multi-frame control channel is configured for extended coverage, and
wherein the at least one wake-up signal is mapped to at least one coverage class, and wherein the multi-frame control channel comprises 51 data burst locations.

2. The apparatus of claim 1, wherein based on the apparatus detecting the at least one wake-up signal is for the network device, the network device is caused to monitor a following N paging blocks for paging occasions using parameters received with the information, where N is an integer.

3. The apparatus of claim 1, wherein the extended coverage is using FN 15-18 in a common control channel of the multi-frame channel.

4. The apparatus of claim 1, wherein the at least one wake-up signal is configured to map different coverage classes of the at least one coverage class to wake-up signal resources.

5. The apparatus of claim 1, wherein the burst format transmission is divided into a first half and a second half and received in one slot of the multi-frame channel, wherein both halves contain a pseudo random sequence,
wherein the at least one non-transitory memory is storing instructions executed by at least one processor to cause the apparatus to perform cross-correlation of the first half with the second half,
wherein the identifying comprises: identifying the at least one wake-up signal is for the network device based on a comparison of at least part of the cross-correlation and a threshold.

6. The apparatus of claim 5, wherein the identifying comprises:
identifying the at least one wake-up signal is for the network device based on at least one of the first half or the second half of the two halves providing an inverse pseudo random sequence of another one of the first half or the second half.

7. A method, comprising:
receiving, by a network device of a communication network, information comprising at least one wake-up signal associated with an occurrence or a non-occurrence of a paging request of a next paging occasion in the communication network; and
identifying whether the at least one wake-up signal of the information is for the network device,
determining, based on the information comprising at least one wake-up signal and based on identifying that the at least one wake-up signal is for the network device, whether to leave, at the next paging occasion, an energy saving sleep mode to receive the paging request,
wherein the at least one wake-up signal comprises a burst format transmission that is received in a multi-frame control channel,
wherein the multi-frame control channel is configured for extended coverage, and
wherein the at least one wake-up signal is mapped to at least one coverage class, and wherein the multi-frame control channel comprises 51 data burst locations.

8. The method of claim 7, wherein based on detecting the at least one wake-up signal is for the network device, the method comprising: monitoring a following N paging blocks for paging occasions using parameters received with the information, where N is an integer.

9. The method of claim 7, wherein the extended coverage is using FN 15-18 in a common control channel of the multi-frame channel.

10. The method of claim 7, wherein the at least one wake-up signal is configured to map different coverage classes of the at least one coverage class to wake-up signal resources.

11. The method of claim 7, wherein the burst format transmission is divided into a first half and a second half and received in one slot of the multi-frame channel, wherein both halves contain a pseudo random sequence, and wherein the identifying comprises: identifying the at least one wake-up signal is for the network device based on at least one of the first half or the second half of the two halves providing an inverse pseudo random sequence of another one of the first half or the second half.

12. The method of claim 11, comprising:
performing cross-correlation of the first half with the second half,
wherein the identifying comprises: identifying the at least one wake-up signal is for the network device based on a comparison of at least part of the cross-correlation and a threshold.

* * * * *